United States Patent [19]

Gerard et al.

[11] Patent Number: 5,012,060
[45] Date of Patent: Apr. 30, 1991

[54] PERMANENT MAGNET THERMAL GENERATOR

[76] Inventors: Frank J. Gerard, 501 Heath Ave., North Lithicum, Md. 21090; Frank Gerard, 12020 Brooknoll Rd., Kingsville, Md. 21087

[21] Appl. No.: 405,188
[22] Filed: Sep. 11, 1989
[51] Int. Cl.$^5$ .............................. H05B 6/10
[52] U.S. Cl. .............................. 219/10.51; 219/10.65; 219/10.491
[58] Field of Search ............ 219/10.51, 10.491, 10.79, 219/10.65, 10.75

[56] References Cited

U.S. PATENT DOCUMENTS

| | | | |
|---|---|---|---|
| 2,549,362 | 4/1951 | Bessiere et al. | 219/10.51 |
| 2,912,552 | 11/1959 | Baermann | 219/10.491 |
| 3,821,508 | 6/1974 | Hagerty | 219/10.491 |
| 4,217,475 | 8/1980 | Hagerty | 219/10.51 |
| 4,238,337 | 12/1980 | Peters et al. | 219/10.491 X |
| 4,421,967 | 12/1983 | Birgel et al. | 219/10.491 |
| 4,511,777 | 4/1985 | Gerard | 219/10.51 |
| 4,600,821 | 7/1986 | Fichtner et al. | 219/10.51 |
| 4,614,853 | 9/1986 | Gerard et al. | 219/10.51 |

Primary Examiner—Philip H. Leung
Attorney, Agent, or Firm—Michael W. York

[57] ABSTRACT

A permanent magnet thermal generator having at least one stationary permanent magnet and a rotatable rotor assembly for producing and absorbing heat from the magnetic flux from the permanent magnet as the rotatable rotor is rotated. The rotor assembly serves as a heat absorber, an impeller to move a heat transfer fluid around the rotor assembly and to transfer heat to the heat transfer fluid that moves around the rotating rotor. In one embodiment the strength of the permanent magnets can be varied by adding or subtracting magnets and in another embodiment the rotor assembly is constructed in such a manner that the heat transfer fluid is recycled around the rotor assembly. Furnace, stream boiler and refrigeration systems incorporating a permanent magnet thermal generator are also set forth.

9 Claims, 4 Drawing Sheets

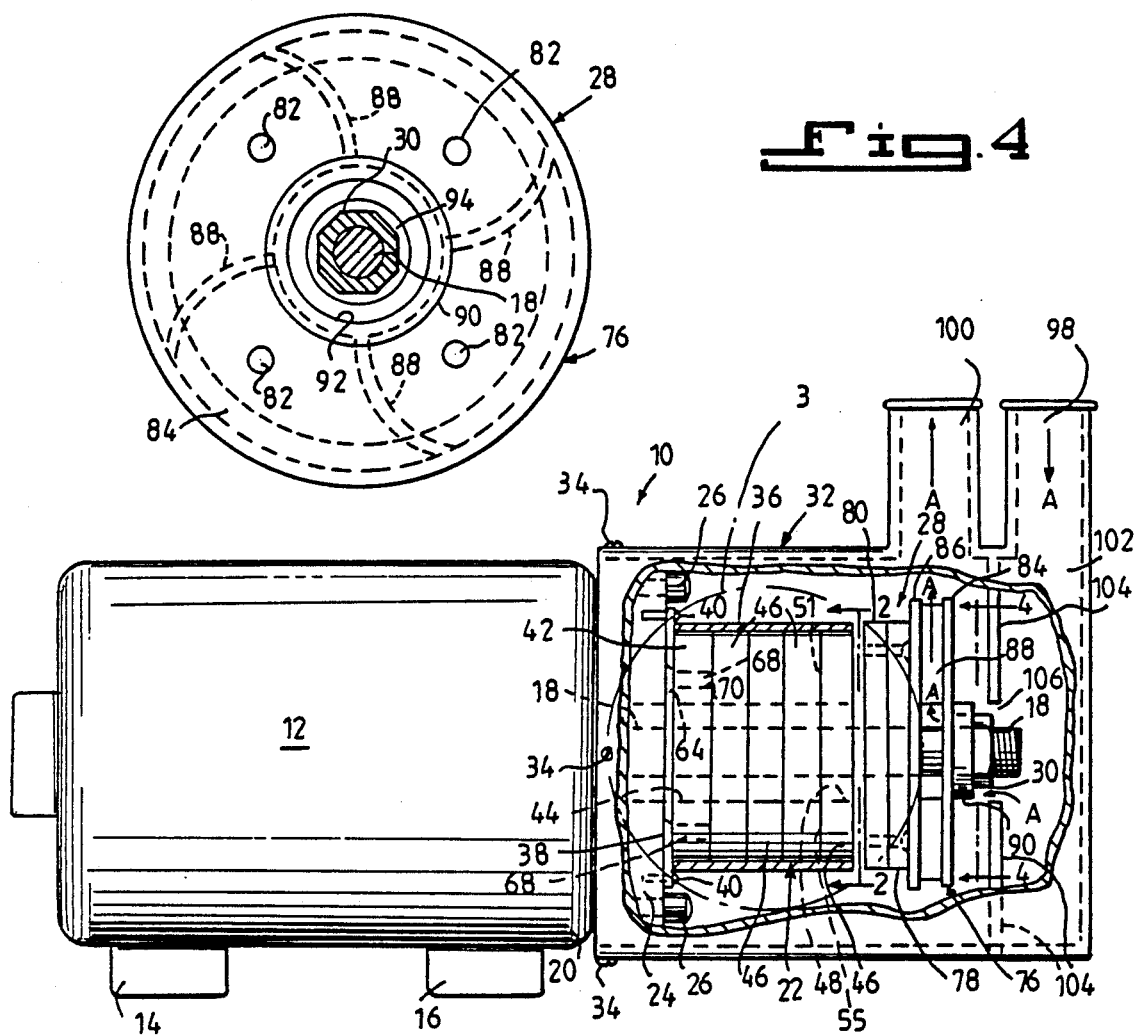
Fig. 4
Fig. 1
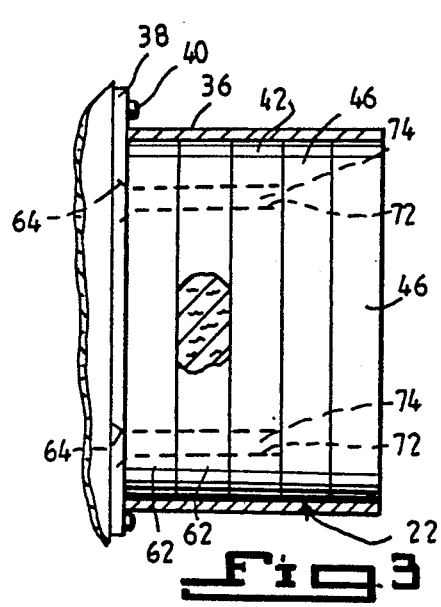
Fig. 3
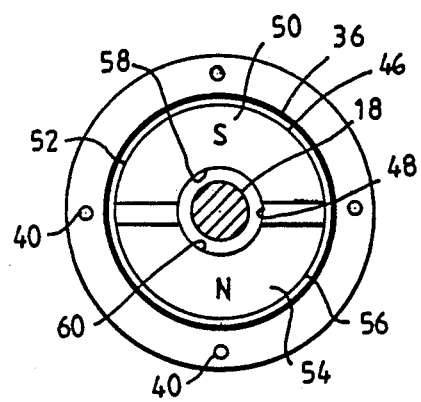
Fig. 2

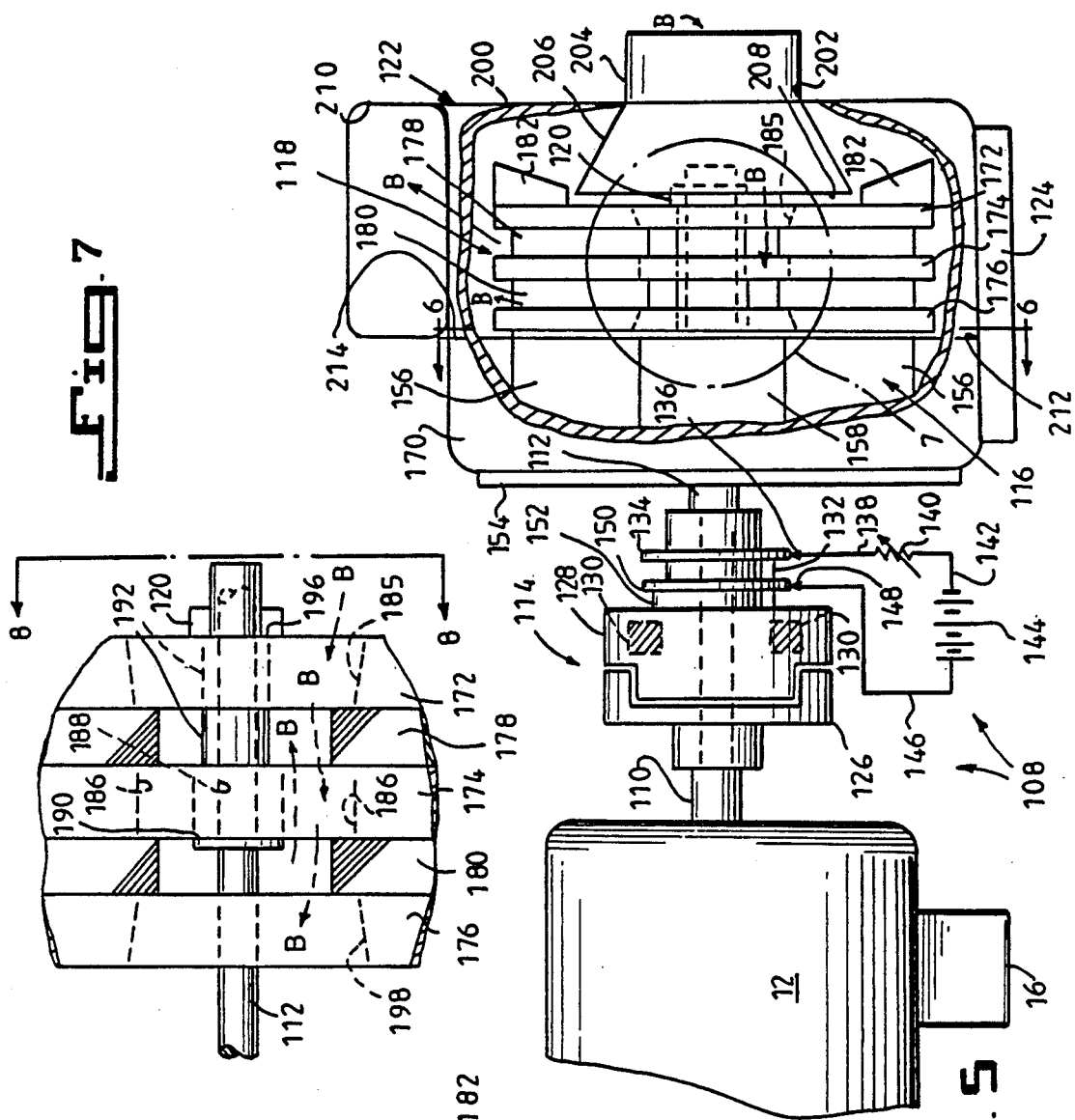
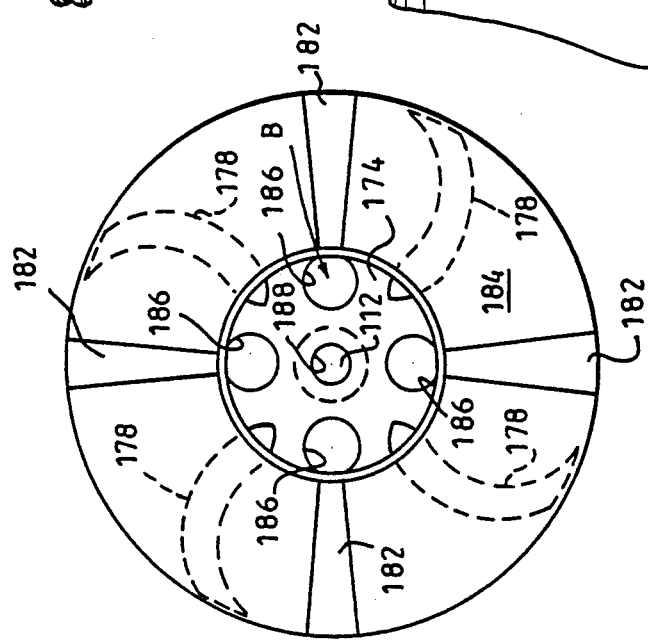

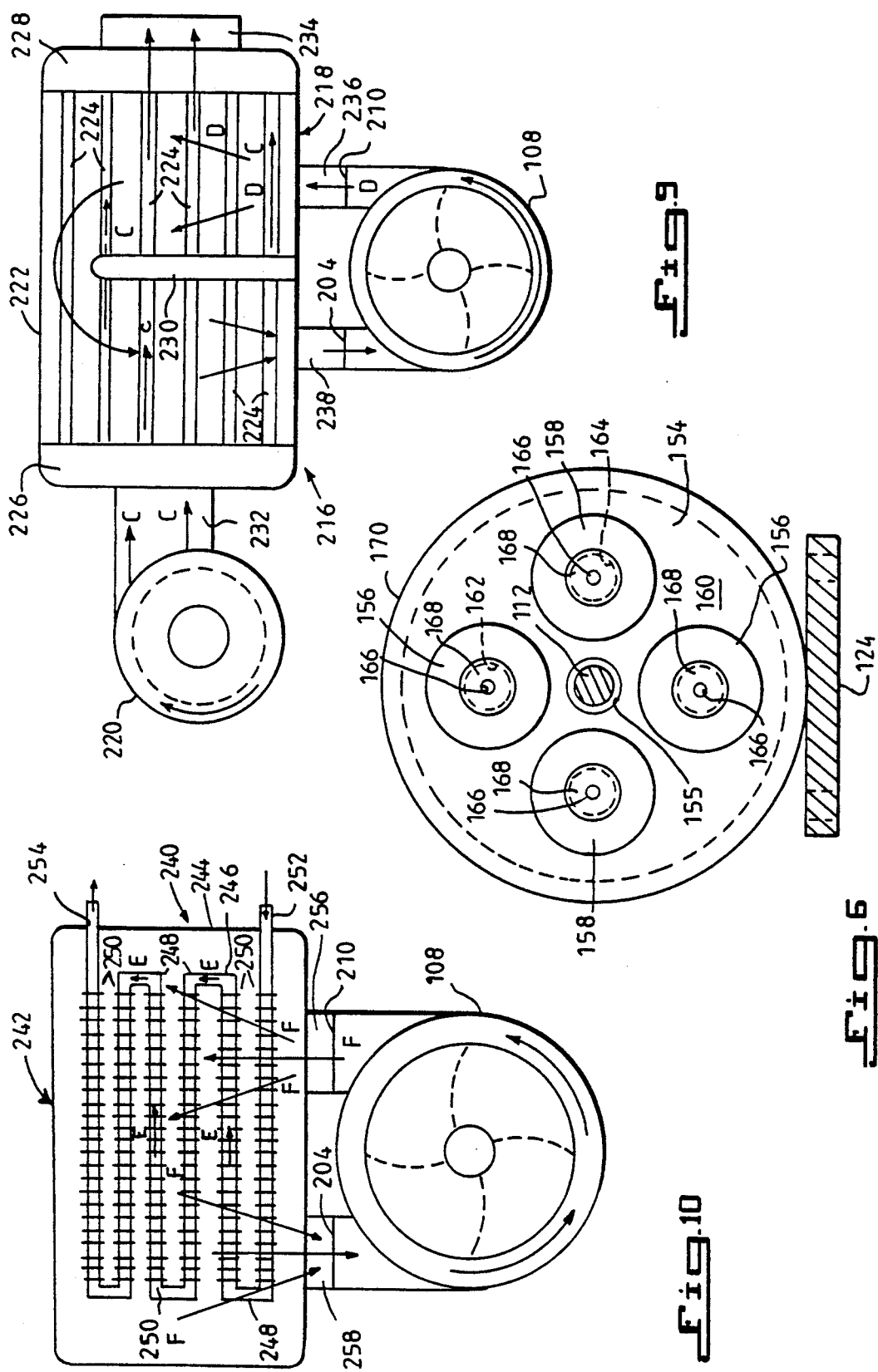

PERMANENT MAGNET THERMAL GENERATOR

BACKGROUND OF THE INVENTION

Many thermal energy generators have serious pollution or other hazardous problems. For instance, radioactive thermal energy generators have the possibility of causing radioactive contamination. Fossil fuel systems can cause serious pollution problems and also carry the risk of fire. For these and other important reasons the use of magnets to generate thermal energy appears to be very attractive.

Permanent magnet thermal generators avoid these problems and offer many advantages. Such magnetic generators produce no flame and hence no pollution and no threat of fire or explosion which means that they can be used in a flammable or explosive environment. In fact permanent magnetic thermal generators can be used in conjunction with a heat transfer fluid that is flammable or explosive. Also, of course, permanent magnetic generators have no problems related to radiation or with radioactive contamination such is the case with nuclear thermal generating systems.

Permanent magnetic thermal generators are also very compact and can be used with various types of inputs. The heat produced by a permanent magnetic generator is also comparatively confined and it is also possible to readily transfer this heat to a working fluid.

A number of permanent magnet thermal generators have been suggested in the past. Some of these permanent magnet thermal generators are set forth in U.S. Pat. Nos. 4,511,777 and 4,614,853. The permanent magnet thermal generators set forth in these patents produce fine results for their intended purposes, but the present invention offers some very definite unexpected improvements to the permanent magnet thermal generators set forth in these patents. These permanent magnet thermal generators use rotating magnets that are satisfactory for many uses, but have the undesired effects of putting rotating stresses on the magnets and dispersing the thermal energy among others.

The present permanent magnet thermal generator provides the previous benefits available from permanent magnet thermal generators such as avoiding pollution and the like, but in addition has important new advantages. Such advantages include stationary magnets that increase the efficiency and simplicity of the permanent magnet thermal generator and the ability to concentrate the heat produced and to transfer this heat in a more efficient manner. In addition, the invention has provisions for recirculating the heat transfer fluid that increases the efficiency of the permanent magnet thermal generator.

SUMMARY OF THE INVENTION

This invention relates to magnetic thermal generators and more particularly to magnetic thermal generators that use permanent magnets.

It is an object of the invention to provide a permanent magnet thermal generator having an increased efficiency.

It is an object of the invention to provide a permanent magnet thermal generator that has a simplified construction.

It is an object of the invention to provide a permanent magnet thermal generator that improves the concentration of the heat.

It is an object of the invention to provide a permanent magnet thermal generator with improved heat transfer.

It is an object of the invention to provide a magnetic thermal generator with increased area for heat transfer.

It is also an object of the invention to provide a permanent magnet thermal generator which uses the same component for heat absorption and for heat transfer.

It is an object of the invention to provide a permanent magnet thermal generator that uses the same component for fluid transfer as for heat absorption and heat transfer.

It is an object of the invention to provide a permanent magnet thermal generator with improved heat transfer fluid movement.

It is also an object of the invention to provide a permanent magnet thermal generator with provision for increasing the heat transferred to the heat transfer fluid.

It is an object of the invention to provide a permanent magnet thermal generator in which the heat transferred to the heat transfer fluid is increased by recycling at least a part of the heat transfer fluid so it is again exposed to the heat transfer surfaces.

It is also an object of the invention to provide a permanent magnet thermal generator which has provision for increasing the movement of the heat transfer fluid.

It is an object of the invention to provide a permanent magnet thermal generator with means for contacting and moving the heat transfer fluid that has an increased fluid contact area.

It is an object of the invention to provide a permanent magnet thermal generator with at least two heat transfer fluid rotors for increasing the heat transfer fluid contact area.

It is also an object of the invention to provide a permanent magnet thermal generator that avoids placing any rotational stresses upon the permanent magnets.

It is an object of the invention to provide a permanent magnet thermal generator that utilizes magnets that are stationary.

It is also an object of the invention to provide a permanent magnet thermal generator with means for readily changing the strength of the permanent magnets.

It is also an object of the invention to provide a permanent magnet thermal generator that utilizes a plurality of permanent magnets.

It is an object of the invention to provide a permanent magnet thermal generator with a plurality of permanent magnets with provision for changing the magnetic strength produced by the magnets.

It is an object of the invention to provide a permanent magnet thermal generator in which the strength produced by the magnets is varied by removing or adding removable substantially identical permanent magnets.

These and other objects of the invention will become apparent from the following description of the invention of a permanent magnet thermal generator that includes stationary magnets, a rotatable assembly for cooperating with the magnets to obtain thermal energy from the magnetic forces caused by the magnets and drive means for causing the rotatable assembly to rotate. The rotating assembly is constructed to serve a number of functions including absorbing heat from magnetic energy, acting as a heat exchanger and means to move a heat exchange medium such as air as well as altering the magnetic force field from the permanent magnets.

BRIEF DESCRIPTION OF THE DRAWINGS

The invention will be hereinafter described in considerable detail with reference to the appended drawings in which:

FIG. 1 is a side elevational view of the permanent magnet thermal generator with portions thereof broken away for clarity;

FIG. 2 is an enlarged view of a portion of the structure illustrated in FIG. 1 taken substantially in the direction 2—2 thereof;

FIG. 3 is an enlarged view of a modification to a portion of the structure illustrated in FIG. 1 taken substantially within the circle 3 thereof;

FIG. 4 is an enlarged view of a portion of the structure illustrated in FIG. 1 taken substantially in the direction 4—4 thereof;

FIG. 5 is a side elevational view of an alternative embodiment of the permanent magnet thermal generator invention with certain portions thereof broken away for clarity;

FIG. 6 is an enlarged view of a portion of the structure illustrated in FIG. 5 taken substantially in the direction 6—6 thereof;

FIG. 7 is an enlarged portion of the structure illustrated in FIG. 5 taken substantially within the circle 7 thereof;

FIG. 8 is a front elevational view of the structure illustrated in FIG. 7 taken in the direction 8—8 thereof;

FIG. 9 is a schematic diagram illustrating the permanent magnet thermal generator of FIGS. 5 through 8 in use in a hot air furnace system;

FIG. 10 is a schematic diagram illustrating the permanent magnet generator of FIGS. 5 through 8 in use in a hot water furnace system;

DETAILED DESCRIPTION OF THE PREFERRED EMBODIMENT

Figure 11:
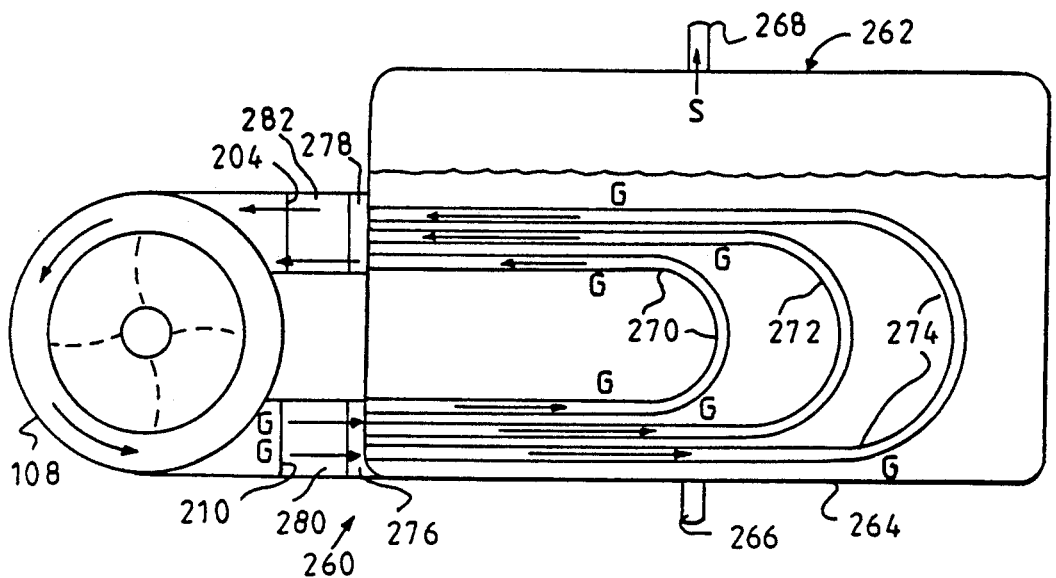
FIG. 11 is a schematic diagram illustrating the permanent magnet thermal generator of FIGS. 5 through 8 in use in a steam boiler system.

The permanent magnet thermal generator invention is illustrated in FIGS. 1 through 3 and is designated generally by the number 10. The permanent magnet thermal generator 10 comprises a conventional alternating or direct current electric motor 12 with motor mounts 14 and 16 and a centrally located rotatably driven cylindrical elongated motor shaft 18 that projects outward from the forward portion 20 of the motor 12. The permanent magnet thermal generator 10 also includes a permanent magnet assembly 22 that is mounted in a stationary manner on the motor 12 by means of a generally rectangular fiber mounting block 24 that is connected to the forward portion 20 of the motor 12 by suitable means known in the art such as by mounting bolts 26 and a rotor assembly 28 that is nonrotatably secured to the outer end portion of the rotor shaft 18 by means of a suitable lock nut 30 known in the art. The thermal generator 10 also has a hollow generally cylindrical housing 32 that surrounds and encloses the magnet assembly 22 and the rotor assembly 28 and is connected to the mounting block 24 in a suitable manner such as by screws 34 or the like.

As best illustrated in FIGS. 1, 2 and 3 the present magnet assembly 22 comprises a hollow generally cylindrical magnet housing 36 with a disc-shaped flange or mounting portion 38 sized and shaped to be located adjacent the fiber mounting block 24 and screws 40 that pass through holes in the outer rim portion of the flange portion 38 and into the mounting block 24 to secure the magnet housing 36 to the mounting block 24. The permanent magnet assembly 22 also includes a substantially circular cylindrical steel magnet backing plate 42 that has a centrally located hole 44 through it that is sized and shaped to permit the shaft 18 to freely pass through it and a series of substantially identical permanent magnet discs 46 that are substantially circular cylindrical shaped with a centrally located hole 48 that is sized and shaped to freely receive the shaft 18 that is located within the interior of the magnet housing 36 with the magnet backing plate 42 being centrally located immediately adjacent the mounting block 24.

As illustrated in FIG. 2, each permanent magnet disc 46 comprises a semi-circular or substantially one-half of a circle permanent magnet south magnetic pole 50 located on the front surface of its upper portion 52 and a substantially identically shaped north magnetic pole 54 located on the front surface of its lower portion 56. As illustrated in FIG. 1, the semi-circular surfaces 51 and 55 located behind the respective south pole surface 50 and the north pole surface 54 have the respective opposite north and south polarities. Each magnetic pole 50 and 54 has a respective semi-circular shaped respective indentation 58 and 60. As best illustrated in FIG. 3, the permanent magnet assembly 22 comprises means for altering the magnetic strength of the magnet assembly 22 comprising magnetic discs 46 that are removable and whose space is replaced by a substantially identically shaped fiber disc 62 or discs 62. This is possible since the disc-shaped mounting portion 38 of the housing 36 has two substantially identical holes 64 for receiving the head portions of mounting bolts 68 whose threads are sized and shaped to fit into and engage the threads in the threaded holes 70 in the steel magnet backing plate 42 and since the fiber discs 62 have holes 72 that are sized and located to receive the shaft portions of bolts 74 that are longer than the mounting bolts 68, but otherwise substantially identical. This arrangement permits the desired permanent magnet disc or discs 46 to be removed and then have the space of the magnet discs 46 that have been removed replaced by an identical number of fiber discs 62.

In making this replacement, it should be noted that the fiber discs are located behind the magnet backing plate 42 or between the backing plate 42 and the mounting portion 38 of the housing 36. The length of the shaft portions of the replacement mounting bolts 74 will, of course, depend upon the number of magnet discs 46 that are removed and replaced by the fiber discs 62. This arrangement permits the same housing 36 to be used with various numbers of magnet discs 46 and a corresponding difference in the magnetic strength of the magnet assembly 22.

The rotor assembly 28 is illustrated in FIGS. 1 and 4 and comprises a disc shaped rotor member 76, a ferromagnetic disc shaped condenser plate 78 located immediately adjacent to and behind the rotor member 76 and a copper disc shaped heat absorber plate 80 that is located immediately adjacent to and inside of the condenser plate 78. As illustrated in FIG. 4 the rotor member 76, condenser plate 78 and the heat absorber plate 80 are connected together by suitable heat sink bolts 82 that pass through the rotor member 76 and the condenser plate 78 and are threaded into the heat absorber plate 80. In addition, the rotor member 76 is also thermally welded to the condenser plate 78.

The rotor member 76 comprises two flat plate portions 84 and 86 that are connected and separated by four flat spiral rotor vane portions 88. An air intake projection 90 extends outward from the plate 84 and it has a circular intake opening 92 for permitting air to pass into the area between the plate portions 84 and 86 and be acted upon by the vanes 88. A cylindrical hub portion 94 extends outward from the plate portion 84 into the opening 92 and it has a hole for slideably receiving the shaft 18. The previously mentioned locknut 30 that is threaded onto the end of the shaft 18 is tightened against the hub portion 94 to secure the rotor member 76 to the shaft 18 by friction or through other means known in the art. Consequently, when the shaft 18 rotates the entire connected rotor assembly 28 that includes the rotor member 76 which also rotates.

The generally cylindrical shaped hollow housing 32 illustrated in FIG. 1 forms an important part of the permanent magnet thermal generator 10 and as illustrated it has a generally cylindrical hollow inlet 98 for the intake of air or similar gases and an adjacently located substantially similar generally cylindrical hollow exhaust outlet for the exhaust of heated air or similar gases. Both the inlet 98 and the outlet 100 are located on the housing 32 so that the project upward and outward from the upper portion of the main cylindrical hollow shell 102 that surrounds the magnet assembly 22 and the rotor assembly 28.

A substantially flat disc-shaped baffle member 104 extends completely across the interior of the cylindrical hollow shell 102 at a location between the inlet 98 and the outlet 100 so that the air or the like that enters the inlet 98 and the adjacent portion of the shell 102 is separated from the air or the like in the other portions of the shell 102 that is connected to the outlet 100. The baffle member 104 has a centrally located round hole 106 that is located adjacent the generally cylindrical air inlet projection 90 that has the circular air intake opening 92 and rotates with the rotating shaft 18. In view of this arrangement air or the like in the portion of the hollow shell 102 that is connected to the inlet 98 must pass through the intake opening 92 in the rotor assembly 28 to reach the other portions of the interior of the hollow shell 102 that is connected to the outlet 100. Air or the like that passes from the portion of the hollow shell 102 that is connected to the inlet 98 through the intake opening 92 is pushed outward by the rotor vane portions 88 and into the portion of the hollow shell 102 that is connected to the outlet 100 and in the process the air or the like is heated by the transfer of heat from the rotor vane portions 88 in a manner that will hereinafter be described in detail.

FIGS. 5 through 8 illustrate an additional embodiment of the permanent magnet thermal generator invention that is designated generally by the number 108. The permanent magnet thermal generator 108 has the same electric motor 12 as the previously described generator 10. However, the single rotatable shaft 18 has been replaced by two shafts 110 and 112 that are interconnected by clutch means comprising an electromagnetic clutch or a suitable shaft coupler designated generally by the number 114 for variably rotatably interconnecting the shafts 110 and 112. The permanent magnet thermal generator 108 also comprises a permanent magnet assembly 116 located around the shaft 112, a rotor assembly 118 that is fixed in place on the outer end portion of the rotatable shaft 112 by means of the lock nut 120 and a hollow generally cylindrical rotor housing 122 that surrounds the rotor assembly 118. Both the rotor housing 122 and the permanent magnet assembly 116 are secured at their lower portions to a substantially flat rotor housing mounting member 124 by suitable means known in the art that not only serves to mount the rotor housing 122 and the permanent magnet assembly 116, but also to secure the rotor housing 122 and the magnet assembly in position adjacent each other.

The electromagnetic clutch 114 is illustrated in FIG. 5 and comprises a clutch plate 126 that is rigidly secured by means known in the art to the rotatable shaft 110 that is connected to the drive motor 12 and another magnetic clutch plate 128 that is rigidly secured by means known in the art to the rotatable shaft 112 and cooperates with the clutch plate 128 through a magnetic field. The clutch plate 128 has an electromagnet 130 electrically connected by the lead 132 to the electric slip ring 134, electric slip ring pick up 136, lead 138, and Variable resistor 140. The variable resistor 140 is in turn connected to the lead 142, that is connected to one terminal of a suitable battery 144 that is connected via the lead 146, slip ring contact 148, slip ring 150, and lead 152 to the electromagnet 130.

In view of this arrangement the magnetic force between the clutch plate 128 and the clutch plate 126 can be varied by varying the value of the variable resistor or rheostat 140 in a manner known in the art. As a result of this arrangement the load upon the drive motor 12 can be reduced when it is started up by allowing the clutch plates 126 and 128 to slip due to a reduced magnetic field. Also, the revolutions per minute r.p.m. of the shaft 112 that is connected to the rotor assembly 118 can be reduced in the same manner even though the r.p.m. of the shaft 110 is higher by allowing slipage between the clutch plates 126 and 128 by reducing the magnetic field.

The permanent magnet assembly 116 is illustrated in FIGS. 5 and 6 and comprises a substantially flat circular shaped ferromagnetic backing plate member 154 with a centrally located hole 155 for the shaft 112 and an array of substantially cylindrical shaped substantially identical alternating north and south permanent magnet members 156 and 158 projecting from the backing plate member surface 160 that faces the rotor assembly 118. The north magnet members 156 and the south magnet mambers 158 are located around the rotatable shaft 112 in such a manner that a north magnet member 156 is separated from another north magnet member 156 by a south magnet member 158. It will, of course be appreciated that the opposite end portions of the north magnetic member 156 and the south magnetic member 158 will have the opposite respective south and north polarity. Each north and south magnet member 156 and 158 has a respective hole 162 and 164 extending through it lengthwise. A series of identical securing bolts 166 pass through the holes 162 and 164 and are threaded into suitable holes in the backing plate member 154. These bolts 166 secure the magnet members 156 and 158 to the backing plate member 154 since they pass through central holes in substantially flat circular aluminum holding cap members 168 that are engaged by the heads of the bolts 166 and also contact the ends of the north and south magnet members 156 and 158. A substantially cylindrical shaped hollow housing 170 surrounds the magnet members 156 and 158 and is connected to the backing plate member 154 by means known in the art.

The rotor assembly 118 set forth in FIG. 5 is also illustrated in further detail in FIGS. 7 and 8. As illustrated, the rotor assembly comprises three substantially flat circular plates 172, 174, and 176 that are spaced apart from each other by a first series of substantially identical heat sink vanes 178 located between the plates 172 and 174 and a second series of substantially identical curved heat sink vanes 180 located between the plates 174 and 176. The outer plate 172 is an aluminum heat conductive fan plate and has four spaced apart generally truncated triangular shaped fan vanes 182 projecting outward from the outer fan plate surface 184. The fan plate 172 has a circular inward tapering inlet hole 185 in it for permitting the entrance of air and the inner surface of the plate 172 is thermally welded to the heat sink vanes 178 that are in turn thermally welded to the outer surface of the adjacent ferromagnetic condensing plate 174.

The condensing plate 174 has four substantially identical substantially circular holes 186 extending through this interior portion for permitting the passage of air from one side of the plate 174 to the other. The center portion of the condensing plate 174 has a hole 188 for slidably receiving the shaft 112 and its inner surface adjacent the hole 188 rests against a shoulder 190 on the shaft 112. A cylindrical shaped collar 192 fits around the shaft 112 and its inner end portion 194 pushes against the other side of the condenser plate 174 adjacent the hole 188 when the lock nut 120 is threaded on the threaded portion of the shaft 112 so as to exert a force against the outer end portion 196 of the collar 192 and hence secure the rotor assembly 118 to the shaft 112. The condenser plate 174 is thermally welded on its inner surface to the adjacent heat sink vanes 180 that are in turn suitably thermally welded to the adjacent plate 176 that is a heat absorber plate made from copper which has an outward tapering centrally located circular shaped hole 198 for recycling air through the rotor assembly 118.

The hollow housing 122 for the rotor assembly 118 is illustrated in FIG. 5 and as illustrated, the housing is generally cylindrical shaped with a substantially circular flat outer surface plate 200 that has a centrally located circular hole 202. A substantially cylindrical circular shaped hollow inlet duct 204 is located in the hole 202 and a hollow flared inner inlet duct 206 extends from the inlet duct 204 inward into the housing 122 to a point immediately adjacent the rotor assembly 118. The inner end portion 208 of the inner inlet duct 206 is suitably sized so that it fits within the fan vanes 182. An exhaust port opening 210 is located in the upper outer portion of the hollow housing 122.

In view of this arrangement, air is taken in through the air intake or inlet ducts 204 and 206, passed through the rotor assembly 118, recirculated through the rotor assembly 118 and then exhausted through the exhaust port 210. Also, since the rear opening 212 of the rotor housing 122 is sized and shaped to correspond to the forward substantially circular opening 214 of the magnet housing 170, air under the action of the rotor assembly 118 is free to circulate around the magnets 156 and 158.

FIG. 9 is a schematic diagram of a magnetic hot air furnace system designated generally by the number 216 that uses the permanent magnet thermal generator 108 that was previously described in relation to FIGS. 5 through 8. It should be noted that for convenience and clarity the thermal generator 108 has been illustrated schematically in FIG. 9. As illustrated in FIG. 9, the magnetic hot air furnace system 216 comprises a heat exchanger 218, a squirrel cage fan 220 for providing cool air to the heat exchanger 218 and the permanent magnet thermal generator 108 for providing hot air to the heat exchanger 218. The heat exchanger 218 has a generally cylindrical hollow heat exchange chamber 222 that has a series of hollow heat exchanger tubes 224 extending through it that are connected at one end to an intake manifold 226 and at the other end to an exhaust or heat air manifold 228. A dividing plate 230 extends cross-wise across a substantial portion of the interior of the heat exchange chamber 222 for separating and directing the hot air.

The magnetic hot air furnace system 216 also includes a heat exchanger cool air intake duct 232 that connects the fan 220 to the intake manifold 22 and an exhaust heated air duct 234 that is connected to the exhaust manifold 228 and conveys the heated air to a suitable location away from the exhaust manifold 228. The outlet 210 of the permanent magnet thermal generator 108 is connected to a hollow inlet duct 236 that is connected to the heat exchange chamber 222 of the heat exchanger 218 to permit heated air from the thermal generator 108 to pass to the heat exchange chamber 222. In addition, a hollow outlet duct 238 connects the heat exchange chamber 222 to the air intake duct 204 and as a consequence the same air can be circulated through both the thermal generator 108 and the heat exchange chamber 222 of the heat exchanger 218.

FIG. 10 is schematic diagram of a magnetic hot water furnace system designated generally by the number 240 that uses the permanent magnet thermal generator 108 that was previously described in connection with FIGS. 5 through 8. The magnetic hot water furnace system 240 comprises an air to water heat exchanger 242 that has a hollow generally cylindrical heat exchange chamber 244. A heat exchange tube 246 is located within the heat exchange chamber 244 and the heat exchange tube 246 has a series of coils or loops 248 with heat exchange fins 250 surrounding and extending outward from the coiled or looped portion of the heat exchange tube 246 for assisting in transferring heat from the air around the outside of the heat exchange tube 246 to the water in the interior of the tube 246. The heat exchange tube 246 has a cold water intake portion 252 that extends outside the heat exchange chamber 244 and a hot water exhaust or outlet portion 254 that also extends outside the chamber 244.

The furnace system 240 also comprises the thermal generator 108 with its inlet 204 and its outlet 210 and a hollow heat exchanger inlet conduit 256 extends from the outlet 210 into the interior of the heat exchange chamber 244 and a hollow heat exchanger outlet conduit 258 extends form the interior of the heat exchange chamber 244 to the inlet 204 of the thermal generator 108. In view of this arrangement hot air from the magnet thermal generator 108 is circulated into the heat exchange chamber 244 and then returned to the generator 108.

FIG. 11 is a schematic diagram of a magnetic steam boiler system designated generally by the number 260 that includes the permanent magnet thermal generator 108 that was previously described in connection with FIGS. 5 through 8. The magnetic steam boiler system 260 comprises a steam boiler 262 with a hollow heat exchange chamber 264 having a water inlet conduit 266 in its lower portion for permitting water to pass into the interior of the heat exchanger chamber 264 and a steam outlet conduit 268 extending from its upper portion for permitting steam to pass out of the interior of the heat exchange chamber 264. A series of hollow U-shaped air tubes 270, 272, and 274 extend into the interior of the heat exchanger chamber 264 and one end of theses tubes is connected to an air intake manifold 276 and the other to an air exhaust manifold 278 that are in turn connected to respective hollow intake and exhaust conduits 280 and 282. The hollow intake and exhaust conduits 280 and 282 are in turn connected to the respective outlet 210 and inlet 204 for the permanent magnet thermal generator 108 that also forms part of the steam boiler system 260. This arrangement permits hot air from the thermal generator 108 to pass into the interior of the boiler heat exchange chamber 264 where it heats water in the chamber 264.

Figure 12:
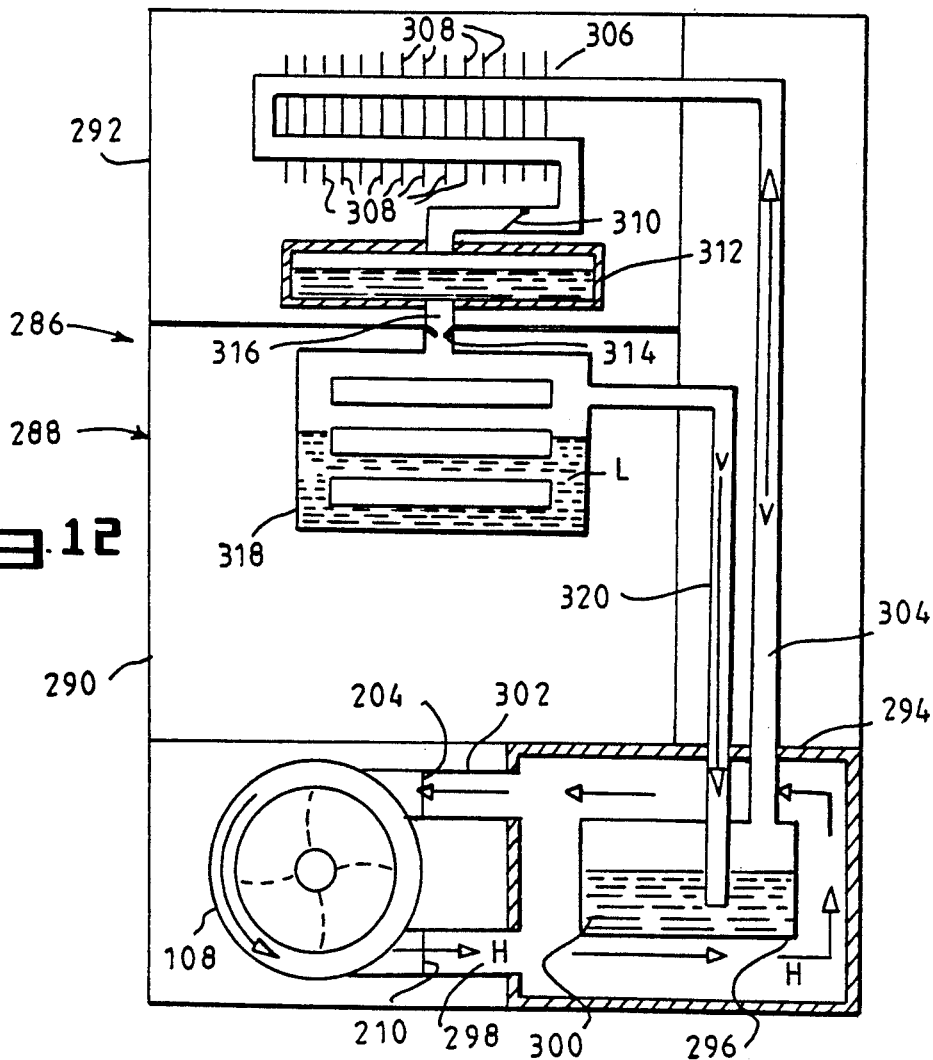
FIG. 12 is a schematic diagram of the permanent magnet thermal generator of FIGS. 5 through 8 in use in a refrigeration system.

FIG. 12 is a schematic diagram of a magnetic refrigeration system designated generally by the number 286 that includes the permanent magnet thermal generator 108 that was previously described in connection with FIGS. 5 through 8. The magnetic refrigeration system 286 comprises a generally rectangular shaped hollow housing 288 that houses a cooling chamber 290, a condenser housing 292, an insulated hot air chamber 294 and the permanent magnet thermal generator 108. The hot air chamber 294 contains an ammonia and water chamber 296 that contains an ammonia and water mixture. An inlet tube 298 is connected to the outlet 210 of the permanent magnet heat generator 108 and permits heat from the heat generator 108 to pass into the hot air chamber 294 where it transmits heat to the ammonia water mixture 300 and this hot air is passed out of the outlet tube 302 and into the inlet 204 of the heat generator 108. An outlet conduit 304 is connected to the top portion of the ammonia and water chamber 296 and to a condenser 306 in the condenser housing 292 where through the use of cooling fins 308 the ammonia vapor gives off heat and condenses into a liquid that passes through a check valve 310 and into an insulated liquid receiving chamber 312.

As illustrated in FIG. 12, liquid in the liquid receiving chamber 312 passe through the restrictor 314 in the outlet conduit 316 and into the evaporator 318 in the cooling chamber 290 where the ammonia evaporates and in the process absorbs heat from the cooling chamber 290 and hence cools the cooling chamber 290. Ammonia vapor then passes from the evaporator 318 through the return line 320 to a point below the liquid level line in the ammonia and water chamber 296 where it condenses only to be heated by the heat from the magnet heat generator 108 in the previously described manner.

The invention is made and used in the following manner. In the preferred embodiment of the permanent magnet thermal generator 10 illustrated in FIGS. 1 through 3 the drive motor 12 can be an off the shelf motor whose size is selected according to the size and capacity of the thermal generator 10. Depending upon the type of drive motor 12 that is selected, it may be necessary to extend or add to the shaft 18 to produce the desired length. In the preferred embodiment, the shaft 18 should be made form stainless steel and so should the lock nut 30. The mounting block 24 is made from a suitable impregnated fiber heat resistant material known in the art by suitable machining techniques know in the art. In the preferred embodiment the magnet housing 36 is made from suitable high strength aluminum and the backing plate 42 is made from carbon steel. The permanent magnet discs 46 are made using conventional techniques using suitable magnets known in the art of an appropriate size and strength for the size of the thermal generator 10.

The fiber discs 62 can be made through the use of conventional techniques from various types of heat resistant impregnated materials. The condensor plate 78 is made from carbon steel and the absorber plate 80 is made form copper through convenitonal techniques. The rotor 76 is made in the preferred embodiment from high strength aluminum alloy and the housing 32 is made from a suitable stainless steel known in the art. The other portions of the permanent magnet thermal generator 10 are conventional in nature and readily available.

The construction of the permanent magnet thermal generator 108 illustrated in FIGS. 5 through 8 is in general similar to that for the previously described embodiment 10. As previously indicated the same drive motor 12 is used. The backing plate 154 is made from carbon steel and the housings 122 and 170 are made from from a suitable stainless steel in a manner known in the art. The magnets 156 and 158 are made from suitable magnetic materials known in the art and their size and strengths can be varied depending upon the desired characteristics of the generator 108. The clutch 114 is in itself conventional in nature and hence its manner and materials of construction will not be described in detail. The choice of the size of the clutch 114 will depend upon the size and expected output of the thermal generator 108 and the expected need to vary the thermal output of the thermal generator 108. The associated shafts 110 and 112 will be made from stainless steel in the preferred embodiment.

The rotor assembly 118 in the preferred embodiment has its heat absorber plate 176 and its vanes 178 and 180 made from copper and its condensing plate 174 is made from carbon steel. The fan plate 172 and associated projecting fan vanes 182 are made from aluminum and may be cast as one integral unit using casting techniques known in the art. The various components of the rotor assembly 118 are secured together by welding and in the case of the aluminum fan plate 172 the welding can employ the use of an inert gas such as Helium in Heliarc welding. Any required machining on the rotor assembly or its components is conventional and employs known methods. The other components of the permanent magnet thermal generator 108 are available commercially and hence need not be described in detail.

The magnetic hot air furnace system 216 of FIG.9, the magnetic hot water furnace system 240 of FIG. 10, the magnetic steam boiler system 260 of FIG. 11 and the magnetic refrigeration system 286 of FIG. 12 all utilize the previously described permanent magnet thermal generator 108. With the exception of the thermal generator 108, all of the other components of the magnetic hot air furnace system 216, the magnetic hot water furnace system 240 and the magnetic steam boiler system 260 are in themselves conventional and known in the art. Consequently, a detailed description of the manner of construction of these known components is not necessary for an understanding of the invention.

The permanent magnet thermal generator 10 and the permanent magnet thermal generator 108 are used in the following manner. Generally, the permanent magnet thermal generator 10 would be selected for smaller heat requirements whereas the thermal generator 108 would be selected for larger thermal requirements particularly since it has a heat recycle feature associated with its rotor assembly 118. The drive motor 12 that is selected can be either an alternating current (a.c.) motor or a direct current (d.c.) motor. The a.c. motor is less expensive and is more conventional. However, a d.c. motor permits the rate of the revolutions of the motor shaft to be varied and hence the associated heat from the thermal generator 10 or 108 can be varied by varying the reovlutions per minute of the motor. The drive motor 12 will be connected to a suitable source of electric current (not shown) and in the case of a d.c. motor the voltage will be selected to produce the desired revolutions per minute.

With the magnet thermal generator 10, the inlet 98 of its rotor housing 32 is connected to a suitable source of cool or unheated air or other gases and the outlet 100 is connected to area or the like that is to be supplied with hot or heated air or other gases. The drive motor 12 would then be started which will cause the shaft 18 and the rotor assembly 28 to rotate. The rotation of the rotor assembly 28 as a result of the rotating rotor vanes 88 causes air or other gases to be sucked into the interior of the housing 32 near the inlet 98, through the inlet 98 and through the hole 106 in the plate 104 as indicated by the arrows A in FIG. 1. The air or gases then pass through the intake hole 92 in the plate 84 to the area of the rotor vanes 88 where it picks up heat from the rotor vanes 88 and is projected outward by the rotor vanes 88 as indicated again by the arrows A in FIGS. 1 and 4. The reason for the heating action of the rotating rotor assembly 28 is not completely understood. However, it appears that the rotating copper heat absorber plate 80 is heated as a result of its rotating in the field created by the stationary magnetic poles 50 and 54. This could be the result of magnetic hysteresis or eddy currents of electricity. Extensive tests have shown the heating effect to be effective. The condenser plate 78 may also contribute to the heating. The hot air or other gases, as indicated by the arrows A then pass out of the outlet 100 to a suitable location (not shown) when it can be put to use.

FIG. 3 in conjunction with FIG. 1 illustrates how the magnetic strength of the magnetic thermal generator 10 can be easily varied by varying the number of magnetic discs 46 that are located in the magnet housing 36. To accomplish this, the screws 40 are removed to free the magnet housing 36 and its end flange plate 38 from the fiber mounting block 24. The mounting bolts 68 that mount the backing plate 42 are removed as are the desired number of magnet discs 46. The magnet discs 46 that are removed are replaced by fiber discs 62 that are placed on the opposite side of the backing plate 42 from the magnet discs 46. These are secured in place by suitable long bolts such as the bolts 74 and the magnet housing 36 is again secured to the mounting block 24 by the bolts 40. This procedure can, of course, be reversed to add magnet discs 46 to increase the strength of the magnetic flux of the permanent magnet thermal generator 10.

The operation of the permanent magnet thermal generator 108 is substantially similar to that of the previously described thermal generator 10. As a result result of the turning fan vanes 182 when the motor 12 is running air or other gases are pulled into the interior of the rotor housing 122 through the inlet duct 204, through the hole 185 where it receives heat from and is acted upon by the heat sink vanes 178 as indicated by the arrows B in FIGS. 5, 7 and 8. Some of the air or other gases represented by the arrows B will pass through the holes 186 in the condenser plate 174 and be heated by and acted upon by the heat sink vanes 180 and also some of the heated air can be recycled back through the holes 186 to again receive heat from the heat sink vanes 178 as indicated by the arrows B which increases the temperature of the air. After the air or other gases are acted upon by the heat sink vanes 178 and 180, the air is caused to leave the housing through the exhaust port 210 as indicated by the arrows B due to the rotating actions of the fan vanes 182 and the heat sink vanes 178 and 110. Should it be desired to vary the amount of heat generated by the permanent magnet thermal generator 108, this can be done by varying the variable resistor 140 to increase or decrease the magnet strength of the magnetic clutch 114 and hence decrease or increase the speed of the revolutions or r.p.m. of the shaft 112 and connected rotor assembly 118.

The permanent magnet hot air furnace system 216 illustrated in FIG. 9 is used by starting the squirrel cage fan 220 to blow air as indicated by the arrows C. This air C passes through the manifold 226, the tubes 224 in the heat exchange chamber 222, the manifold 228 and passes out the outlet 234. The permanent magnet thermal generator 108 is also started and it causes its hot air represented by the arrows D to pass into the inlet, into the tubes 224 and out the outlet 238 where it is recycled to the thermal generator 108. During this process heat is transferred from the air D through the tubes 224 and to the air C resulting in heated air C leaving the outlet 234.

The permanent magnet hot water furnace 242 of FIG. 10 is used by passing cold water into the inlet portion 252 of the tube 24 in the heat exchanger chamber 244 where the water that passes through the tube 248 in the direction of the arrows E picks up heat from heated air represented by the arrows F from the permanent magnet thermal generator 108. This hot air F is returned to the thermal generator 108 and is recycled. The resulting hot water leaves the outlet portion 254 and is put to a suitable use.

The permanent magnet steam boiler system 260 set forth in FIG. 11 is used by conveying-cold water to the inlet 266 of the chamber 264 to fill the chamber partially full of water to cover the hot air tubes 270, 272, 274. Hot air represented by the letter G is supplied by the thermal generator 108 through the inlet conduit 280, the manifold 276 and into the tubes 270, 272, and 274 where it transfers heat to the adjacently located water. The hot air G that passes through the tubes 270, 272 and 274 passes through the manifold 278 into the exhaust conduit 282 and then is recycled in the permanent magnet thermal generator 108. Some of the water that is heated is converted to steam represented by the letter S and passes out of the chamber 264 through the steam outlet 268 and then is put to a suitable use.

The permanent magnet refrigeration system 286 set forth in FIG. 12 is used by starting the magnetic thermal generator 108 in a conventional manner to cause hot air H it generates to enter the hot air chamber 294 where it causes the ammonia to vaporize and pass up the conduit 304 as indicated by the arrow V to the condenser 306 where it is cooled to form a liquid. This liquid, indicated by the letter L, passes into the container 312 and then through the restriction 314 to the evaporator 318 where the liquid ammonia L evaporates to form a gas represented by the letter V. In the process this cools the cooling chamber 290. The gas V then passes as indicated through the return conduit 320 to the ammonia and water container 296 where the process can be repeated.

Although the invention has been described in considerable detail with reference to certain preferred embodiments, it will be understood that variations and modifications can be made to the invention without departing from the spirit and scope of the invention as set forth in the appended claims.

What is claimed is:

1. A permanent magnet thermal generator comprising at least one stationary permanent magnet, said stationary permanent magnet comprising a disc with a front surface and a rear surface with the front surface having both a north and a fourth magnetic pole located thereon and with the rear surface having both a south and a north magnetic pole located thereon with the north magnetic pole on the rear surface being located behind the fourth magnetic pole on the front surface and the south magnetic pole on the rear surface being located behind the north magnetic pole on the front surface, a rotatable rotor located adjacent said permanent magnet for rotating in the magnetic flux produced by said permanent magnet, said rotatable rotor comprising a non-ferrous heated member located in position to be heated by said permanent magnet and means for moving fluid as said rotatable rotor rotates, and housing means located around said rotor for confining a fluid around said rotor.

2. The permanent magnet thermal generator of claim 1 further comprising means for altering permanent magnetic strength comprising a plurality of said permanent magnet discs with at least one of said discs being removable.

3. The permanent magnet thermal generator of claim 2 wherein said means for altering permanent magnet strength further comprises at least one non-metallic disc sized and shaped to replace said removable permanent magnet disc.

4. The permanent magnet thermal generator of claim 3 wherein said non-metallic disc comprises a fiber material.

5. The permanent magnet thermal generator of claim 3 further comprising a magnet housing surrounding at least a portion of said permanent magnet discs.

6. The permanent magnet thermal generator of claim 5 wherein said discs are cylindrical shaped.

7. The permanent magnet thermal generator of claim 6 wherein said magnet housing comprises a hollow cylindrical member.

8. The permanent magnet thermal generator of claim 7 wherein said magnet housing comprises a non-magnetic material.

9. The permanent magnet thermal generator of claim 8 wherein the non-magnetic material of said magnet housing comprises aluminum.

* * * * *